(12) United States Patent  
Gogo

(10) Patent No.: US 7,275,624 B2  
(45) Date of Patent: Oct. 2, 2007

(54) DISK BRAKE UNIT FOR MOTORCYCLE

(75) Inventor: Kazuhiko Gogo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/772,965

(22) Filed: Feb. 4, 2004

(65) Prior Publication Data

US 2004/0206587 A1     Oct. 21, 2004

(30) Foreign Application Priority Data

Feb. 6, 2003     (JP) .............................. 2003-029446

(51) Int. Cl.  
*F16D 55/08*     (2006.01)

(52) U.S. Cl. .................... 188/72.1; 188/72.4; 188/370; 188/218 XL; 188/18 A

(58) Field of Classification Search ............... 188/72.1, 188/72.4, 72.5, 73.2, 73.45, 73.47, 370, 248 XL, 188/218 A, 18 A  
See application file for complete search history.

(56) References Cited

U.S. PATENT DOCUMENTS

| | | | | |
|---|---|---|---|---|
| 3,708,043 A | * | 1/1973 | Rath et al. ............... | 188/73.46 |
| 3,782,510 A | * | 1/1974 | Rath ........................ | 188/73.43 |
| 4,093,043 A | * | 6/1978 | Smith ....................... | 188/73.46 |
| 4,161,239 A | * | 7/1979 | Karasudani ............. | 188/106 P |
| 4,341,289 A | * | 7/1982 | Smith ....................... | 188/73.39 |
| 4,343,380 A | * | 8/1982 | Kawaguchi ............... | 188/18 A |
| 4,386,682 A | * | 6/1983 | Woo et al. ................ | 188/71.8 |
| 4,418,798 A | * | 12/1983 | Johannesen et al. ..... | 188/73.45 |
| 4,606,439 A | * | 8/1986 | Meynier et al. .......... | 188/73.32 |
| 4,609,078 A | * | 9/1986 | Bach et al. ............... | 188/73.43 |
| 4,716,994 A | * | 1/1988 | Iwamoto .................... | 188/72.2 |
| 4,823,920 A | * | 4/1989 | Evans ....................... | 188/73.34 |
| 4,915,198 A | * | 4/1990 | Hirashita ................. | 188/73.39 |
| 5,036,960 A | * | 8/1991 | Schenk et al. ............ | 188/346 |
| 5,277,279 A | * | 1/1994 | Shimura .................... | 188/72.5 |
| 5,957,245 A | * | 9/1999 | Anger et al. ............... | 188/71.1 |
| 6,189,659 B1 | * | 2/2001 | Doi et al. ................. | 188/73.35 |
| 6,427,810 B2 | * | 8/2002 | Schorn et al. ........... | 188/73.39 |
| 6,478,121 B2 | * | 11/2002 | Reeves ...................... | 188/73.31 |

FOREIGN PATENT DOCUMENTS

DE          10131324 A1 *   7/2002  
JP          3059553         4/2000

* cited by examiner

*Primary Examiner*—Devon C. Kramer  
*Assistant Examiner*—Mariano Sy  
(74) *Attorney, Agent, or Firm*—Hamre, Schumann, Mueller and Larson PC

(57) ABSTRACT

To provide a motorcycle disk brake that can ensure brake force and also enable miniaturization.

A motorcycle disk brake unit (10) has a part (105) of a piston (56) which projects outwards from an outer edge (35) of a brake disk (33), and by forming parts (67), within an outer back plate (65) and an inner back plate (75), corresponding to the piston (56) following the piston (56) so that an outer pad (90) and an inner pad (95) do not project out further than the outer edge (35) of the brake disk (33), another part (68) following the outer edge (35) of the brake disk (33), and a bridge section (53) following respective back plates (65), (75), a part (54) of the bridge section (53) can project further inwards than the piston (56) resulting in miniaturization of disk brake unit (10).

2 Claims, 10 Drawing Sheets

DISK BRAKE UNIT FOR MOTORCYCLE

FIELD OF THE INVENTION

The present invention relates to a disk brake for a motorcycle for gripping a brake disc with pads, by causing a cylinder to be pushed out by hydraulic pressure from a caliper body.

BACKGROUND OF THE INVENTION

There are disk brakes for motorcycles that control a brake disk by gripping the brake disk from both sides using pads.

With reference to Japanese Patent Application No. 3059553,

FIG. 10 is a cross sectional drawing showing a disk brake for a motorcycle.

According to the disk brake 200 for a motorcycle, a caliper body 203 is arranged at an outer periphery 202 of a brake disk 201, an outer pad 206 is arranged between an outer section 204 of this caliper body 203 and the brake disk 201, via an outer back plate 205, and an inner pad 209 is arranged between an inner part 207 of the caliper body 203 and the brake disk 201 via an inner back plate 208.

Together with the outer back plate 205 being pushed out by an outer piston 210, the inner back plate 208 is pushed out by the inner piston 211, and both surfaces of the brake disk 201 are gripped by the outer pad 206 and the inner pad 209.

By causing an upper part 210a of an outer piston 210 and an upper part 211a of an inner piston 211 to project from the outer periphery 202 of the brake disk 201, respective centers of the outer piston 210 and the inner piston 211 are separated from an axle 214 placed towards the outer peripheral edge 155 side of the brake disk 201.

In this way, by separating respective centers of the outer piston 210 and the inner piston 211 from the axle 214 it is possible to increase braking force. Accordingly, it becomes possible to reduce the size of the outer piston 210 and the inner piston 211 while maintaining brake force.

Here, since the upper parts 210a and 211a of the pistons 210 and 211 are caused to project from the outer peripheral edge 155 of the brake disk 201, a bridge section 156 connecting an outer part 204 and an inner part 207 of the caliper body 203 is separated from the outer peripheral edge 155 of the brake disk 201 to the outer side.

Therefore, a distance L from the outer peripheral edge 155 of the brake disk 201 to the inner surface 156a of the bridge section 156 becomes large, and there is a danger that rigidity of the caliper body 203 will be impaired.

In order to preserve rigidity of the caliper body 203, it is necessary to cause the outer surface 156b of the bridge section 156 to project upwardly a lot to make a wall thickness T of the bridge section 156 thick, and this hinders miniaturization of the caliper body 203.

A problem to be solved is therefore to provide a disk brake unit for a motorcycle that maintains brake force as well as enabling miniaturization.

SUMMARY OF THE INVENTION

The present invention is directed to a disk brake unit for a motorcycle, having at least one piston built in to a caliper body having a substantially U-shaped cross section with an outer section and an inner section connected by a bridge section, an outer pad attached to the outer section, an inner pad attached to the inner section, and an outer periphery of a brake disk inserted between the outer pad and the inner pad by hydraulic pressing out of the piston, wherein part of the piston is made to project from an outer peripheral edge of the brake disk to an outer side, the outer pad and the inner pad are not forced out further than outer peripheral edge of the brake disk, and part of the bridge section projects further inwards than the piston.

By causing part of the piston to project from the outer peripheral edge of the brake disk to the outer side, the center of the piston is separated from an axle, towards an outer peripheral surface of the brake disk. By separating the center of the piston from the axle in this way, it becomes possible to increase brake force.

Further, by causing part of the bridge section to project further to the inner side than the piston, it is possible to keep the wall thickness of the bridge section large without causing the outer surface of the bridge section to project to the outer side.

It is therefore possible to maintain rigidity of the caliper body without making the external shape of the caliper body large.

The present invention is also directed to a disk brake unit for a motorcycle, having at least one piston built in to a caliper body having a substantially U-shaped cross section with an outer section and an inner section connected by a bridge section, an outer pad attached to the outer section via an outer back plate, an inner pad attached to the inner section via an inner back plate, and an outer periphery of a brake disk inserted between the outer pad and the inner pad by hydraulic pressing out of the piston, wherein part of the piston projects from an outer peripheral edge of the brake disk to an outer side, the outer pad and the inner pad are not forced out further than an outer peripheral edge of the brake disk, with the inner back plate and the outer back plate, that part corresponding to the piston is formed following the piston, while the remaining part is formed following the peripheral edge of the brake disk, and part of the bridge section is caused to project further inwards than the piston by forming the bridge section following the respective back plates.

In addition, with the inner back plate and the outer back plate, that part corresponding to the piston is formed following the piston. In this way, the back plate is made to contact the entire pressing surface of the piston, and it is possible to block up an opening of the piston.

A further feature of the present invention is that there are a plurality of pistons, the plurality of pistons being lined up along the peripheral direction of the brake disc at specified intervals, with part of the bridge section being caused to project between these pistons.

Here, when the outer periphery of the brake disk is gripped between the outer pad and the inner pad, comparatively large stress is generated in the vicinity of the pistons. Therefore, part of the bridge section is made to project between the plurality of pistons and rigidity in the vicinity of the pistons is efficiently increased by the bridge section.

In addition, by using space between the plurality of pistons, it becomes possible to cause part of the bridge section to project, and since part of the bridge section projects it is not necessary to ensure a new space.

DETAILED DESCRIPTION OF THE PREFERRED EMBODIMENTS

Figure 1:
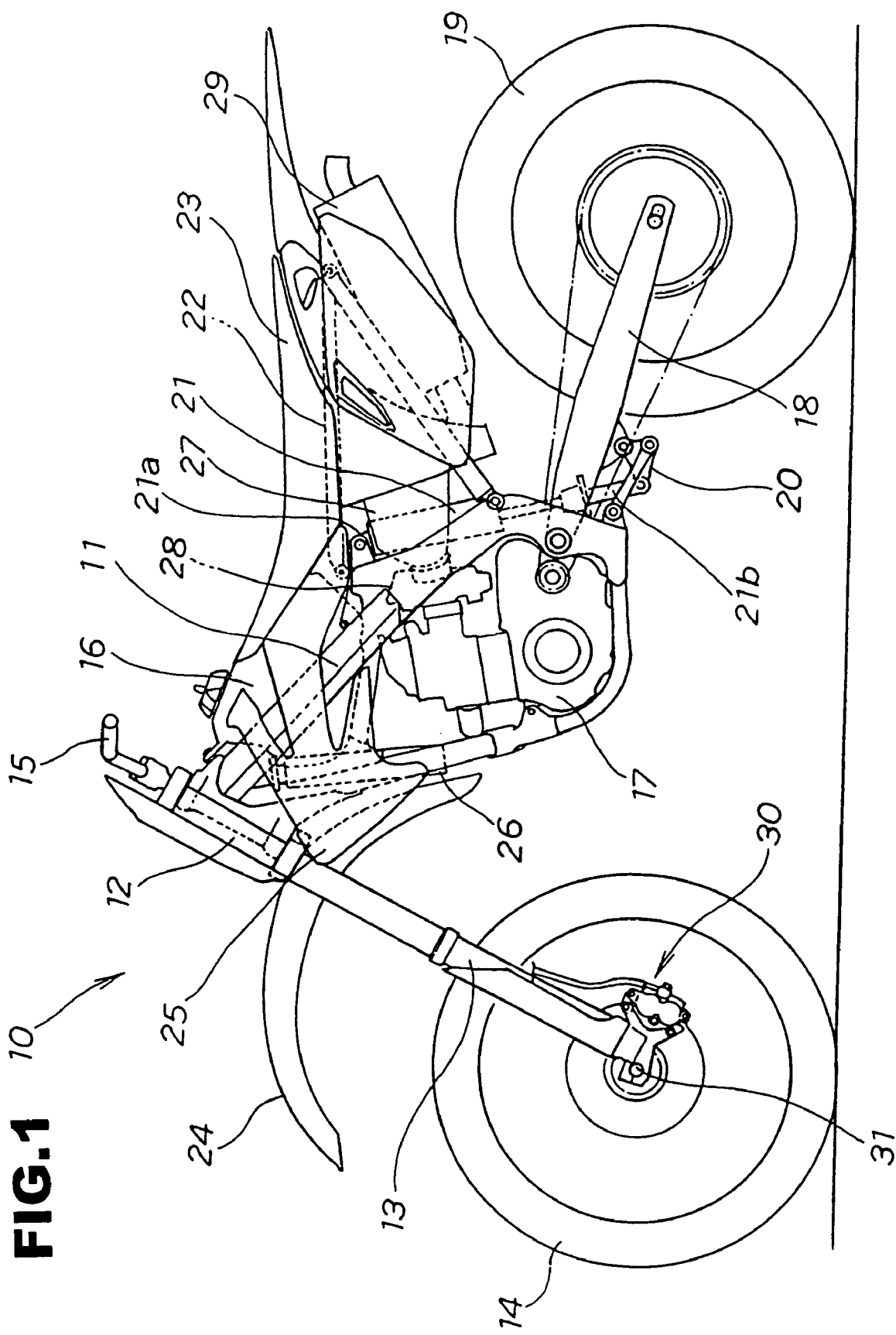
FIG. 1 is a cross sectional drawing showing a motorcycle provided with a motorcycle disk brake unit (first embodiment) of the present invention.

Embodiments of the present invention will now be described based on the attached drawings. Here, "front", "rear", "left" and "right" are directions as viewed by a rider. The drawings are viewed in the orientation of the reference numerals.

FIG. 1 is a side cross sectional drawing showing a motorcycle provided with the motorcycle disk brake unit (first embodiment) of the present invention.

The motorcycle 10 has a front fork 13 attached to a head pipe 12 of a vehicle frame 11, a front wheel 14 supported by the front fork 13, a handlebar 15 attached to the front fork 13, a fuel tank 16 attached to an upper part of the vehicle frame 11, an engine 17 attached below the fuel tank 16, a rear swing arm 18 attached in a swingable manner to a rear end of the vehicle frame 11, a rear wheel 19 attached to a rear part of this rear swing arm 18, a link mechanism 20 attached close to a front end of the rear swing arm 18, a lower part 21b of a rear cushion 21 attached to the link mechanism 20, an upper part 21a of the rear cushion 21 attached to a rear upper part of the vehicle frame 11, a rear frame 22 attached to a rear part of the vehicle frame 11, a seat 23 attached to an upper part of the rear frame 22, and a motorcycle disk brake unit 30 provided on the front wheel 14.

Reference numeral 24 is a front fender, 25 is a front cowling, 26 is a radiator, 27 is an air cleaner, 28 is a carburetor, and 29 is a muffler. The motorcycle disk brake unit 30 will be described in detail in the following.

Figure 2:
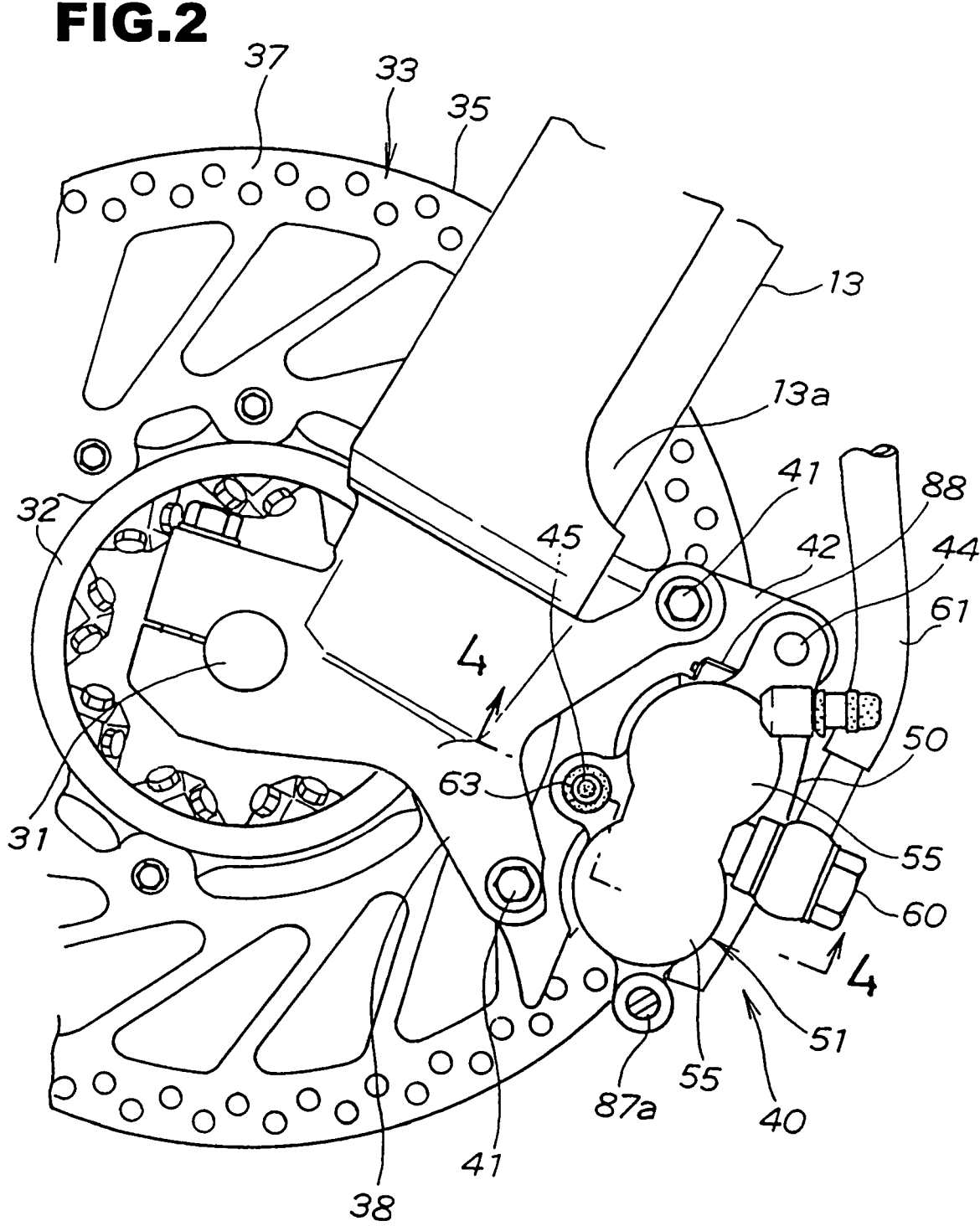
FIG. 2 is a cross sectional drawing showing a motorcycle disk brake unit (first embodiment) of the present invention.

FIG. 2 is a side cross-sectional drawing showing a motorcycle disk brake unit (first embodiment) of the present invention.

The motorcycle disk brake unit 30 has a brake disc 33 attached via a hub cover 32 to an axle 31 of the front wheel 14 (refer to FIG. 1), a support member 38 formed at a lower part 13a of the front fork 13, and a caliper assembly 40 attached to this support member 38 with a pair of upper and lower bolts 41, 41.

The brake disc 33 has an outer edge 35 formed in an arc shape, and is provided with annular friction surfaces running along the outer edge 35, namely an outer friction surface 37 and an inner friction surface 37 (the inner friction surface 37 is not shown).

By pressing an outer pad 90 (refer to FIG. 4) against the outer friction surface 37 and pressing an inner pad 95 (refer to FIG. 4) against the inner friction surface 37, the brake disc 33 is gripped by the outer pad 90 and the inner pad 95.

The caliper assembly 40 comprises an attachment bracket 42 for attachment to the support member 38 with a pair of bolts 41, 41, and a caliper body 50 attached to this attachment bracket 42 using a caliper pin 44 and a bracket pin 45 so as to be capable of sliding in a direction orthogonal to the brake disc 33.

By attaching the caliper body 50 to the attachment bracket 42, the caliper body 50 is arranged at the periphery of the brake disc 33, namely at the friction surfaces 37, 37.

Figure 3:
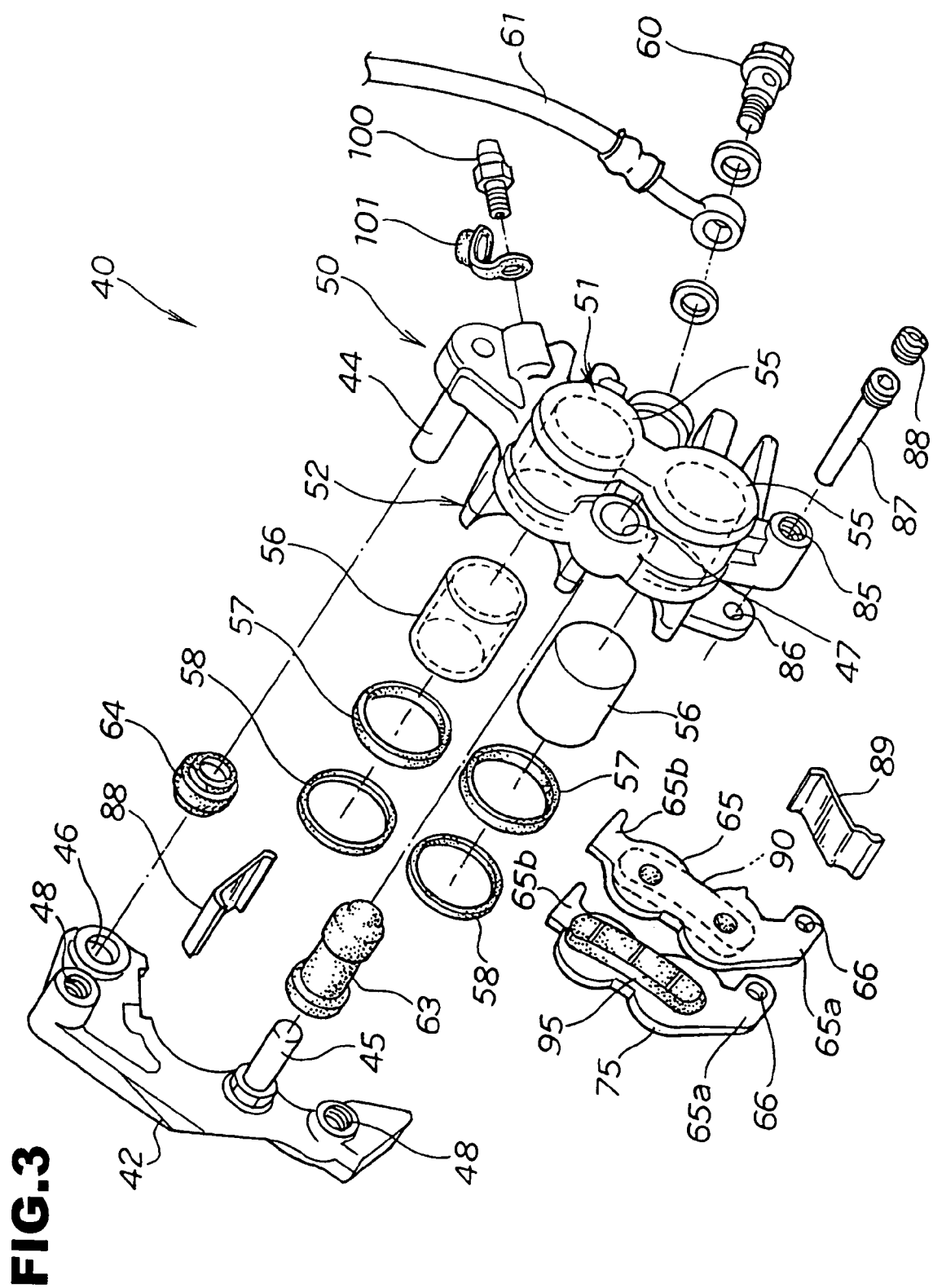
FIG. 3 is an exploded perspective view showing the motorcycle disk brake unit (first embodiment) of the present invention.

FIG. 3 is an exploded perspective view showing the motorcycle disk brake unit (first embodiment) of the present invention.

The caliper body 50 is formed in a substantially U-shaped cross section by joining together an outer section 51 arranged at an outer side of the brake disc 33 (refer to FIG. 4) and an inner section 52 arranged at an inner side of the brake disc 33.

A pair of cylinders 55, 55 are provided at a constant interval on the outer section 51, respective pistons 56, 56 are housed inside these cylinders 55, 55, and piston seals 57, 57 and dust seals 58, 58 are provided inside the cylinders 55, 55. An oil supply passage 61 is connected between the pair of cylinders 55, 55 using a bolt 60. By supplying hydraulic pressure from this oil supply passage 61 to the inside of the cylinders 55, 55, it is possible to press the pair of pistons 56, 56 from the inside of the cylinders 55, 55.

Figure 4:
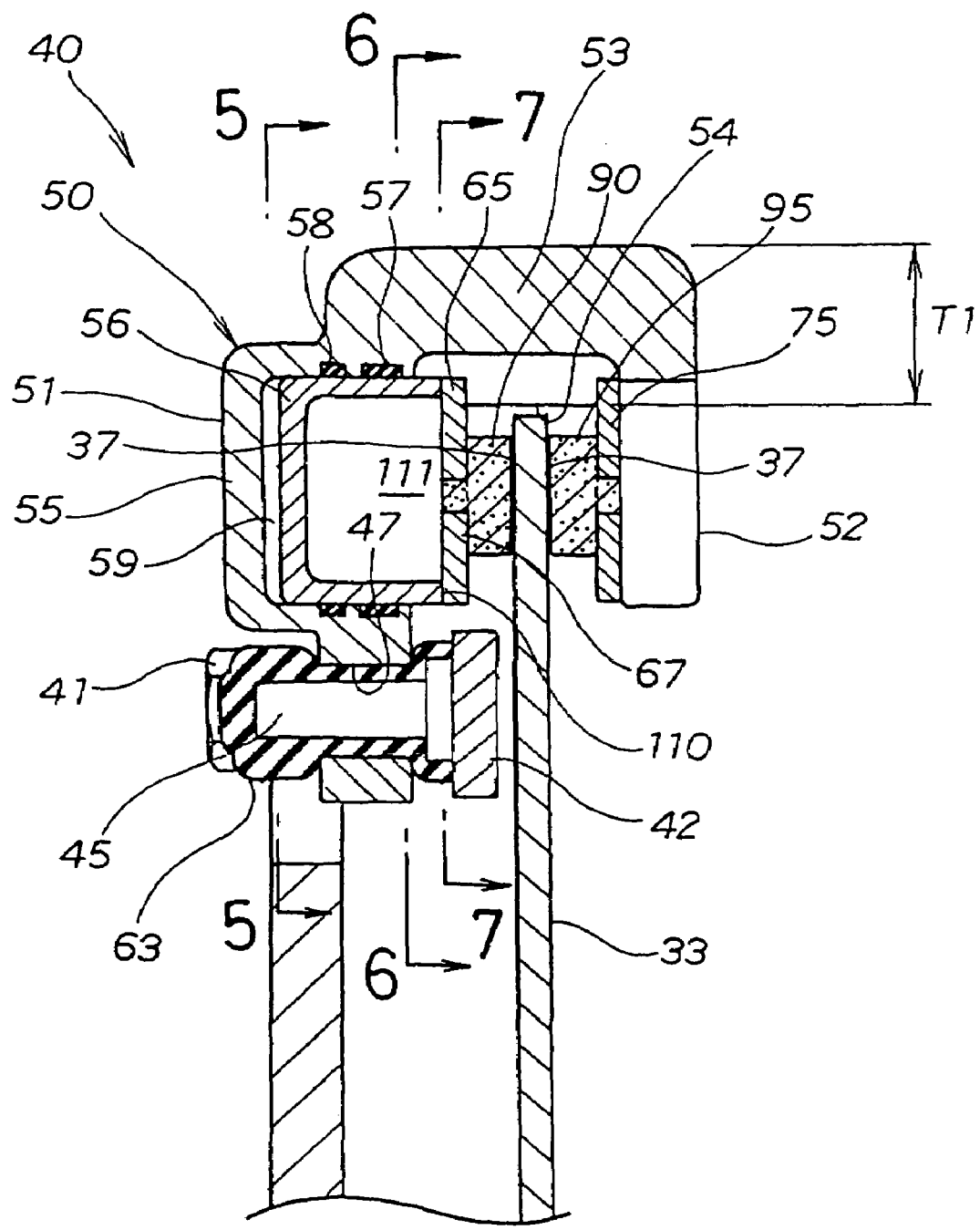
FIG. 4 is a cross sectional drawing along line 4-4 in FIG. 2.

The attachment bracket 42 is arranged at the outer side of the brake disc 33 by attaching the caliper pin 44 to the outer section 51 and slidably inserting this caliper pin 44 into a hole 46 in the attachment bracket 42, and attaching the bracket pin 45 to the attachment bracket 42 and slidably inserting this bracket pin 45 into a hole 47 in the outer section 51 (refer to FIG. 4).

Reference numeral 63 is a bracket pin boot, and the bracket pin boot 63 protects the bracket pin 45 from dust etc. Reference numeral 64 is a caliper pin boot, and the caliper pin boot 64 protects the caliper pin 44 from dust etc.

An outer back plate 65 and an inner back plate 75 are arranged opposite each other between the outer section 51 and the inner section 52, a slide hole 66 of a base end 65a of the outer back plate 65 and a slide hole 66 of a base end 65a of the inner rear back 75 are aligned with an attachment hole 85 of the outer section 51 and an attachment hole 86 of the inner section 52, and a back plate pin 87 is passed through respective attachment holes 85, 86 and the slide holes 66, 66.

87a is a back plate pin plug, and the back plate pin plug 87a is a member for locking the back plate pin 87 at a specified position.

A retainer 88 is attached to a tip section 65b of the outer back plate 65 and a tip section 65b of the inner back plate 75, and the retainer 88 is attached to the caliper body 50. Also, a back plate spring 89 for suppressing rattling of the outer back plate 65 and the inner back plate 75 is arranged at the base end 65a side of the outer back plate 65 and the base end 65a side of the inner back plate 75.

The outer pad 90 is provided on the outer back plate 65 opposite to the outer friction surface 37 (refer to FIG. 4) of the brake disc 33. The inner pad 95 is provided on the inner back plate 75 opposite to the inner friction surface 37 (refer to FIG. 4) of the brake disc 33.

Reference numeral 100 is a bleeder valve, and 101 is a bleeder valve cap. Also, 48, 48 are screw holes, and the screw holes 48, 48 are screw insertion holes for bolts 41, 41.

FIG. 4 is a cross section along line 4-4 in FIG. 2. In this cross section, the back plate spring 89 has been omitted to simplify understanding.

The motorcycle disk brake unit 30 has a pair of pistons 56, 56 housed in the outer section 51 at a specified interval (refer to FIG. 3), the outer pad 90 attached via the outer back plate 65 to the outer section 51, and the inner pad 95 attached via the inner back plate 75 to the inner section 52, and by supplying oil to a space 59 inside the cylinders 55 the pistons 56 are pressed out by hydraulic pressure generated in the space 59, and the frictional surface (outer friction surface 37 and inner friction surface 37) of the brake disc 33 are gripped by the outer pad 90 and the inner pad 95.

Specifically, by pressing out the pistons 56 using hydraulic pressure, the outer pad 90 is brought into contact with the outer friction surface 37 of the brake disc 33. The caliper body 50 is slidably moved to the outer side of the brake disc 33 by the caliper pin 44 and the bracket pin 45, and the inner pad 95 is brought into contact with the inner friction surface 37 of the brake disc 33. As a result, the friction surfaces 37, 37 of the brake disc 33 are gripped by the outer pad 90 and the inner pad 95.

Figure 5:
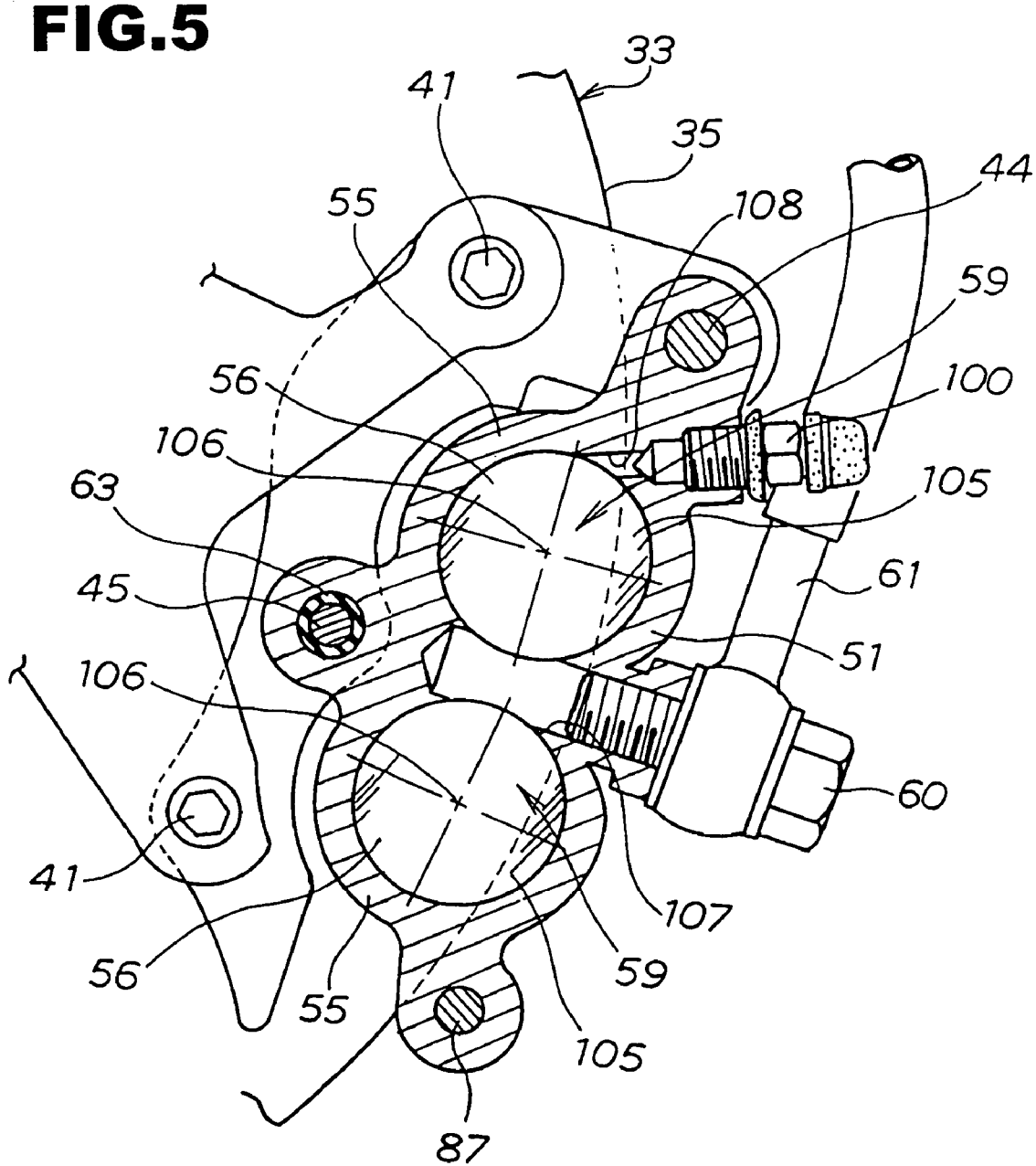
FIG. 5 is a cross sectional drawing along line 5-5 in FIG. 4.

FIG. 5 is a cross section along line 5-5 in FIG. 4.

Parts 105, 105 of the pair of pistons 56, 56, are made to project from the outer periphery 35 of the brake disc 33 to the outer side, that is, radially outwards.

Therefore, centers 106, 106 of the pistons 56, 56 are moved away from the axle 31 (refer to FIG. 2) towards the outer edge 35 of the brake disc 33. In this way, by moving the centers 106, 106 of the pistons 56, 56 away from the axle 31 (refer to FIG. 2), it is possible to increase braking force of the motorcycle disk brake unit 30.

This means that it is possible to miniaturize the pistons 56, 56 while maintaining brake force of the motorcycle disk brake unit 30.

Here, a communicating hole 107 communicates with the inside of the outer section 51, and an oil supply passage 61 is attached to this communicating hole 107 with a bolt 61. Oil inside the oil supply passage 61 is supplied through the communicating hole 107 to spaces 59, 59 (refer to FIG. 4) inside the cylinders 55, 55.

The bleeder valve 100 communicates with the spaces 59, 59 (refer to FIG. 4) inside the cylinders 55, 55 via a through hole 108.

Figure 6:
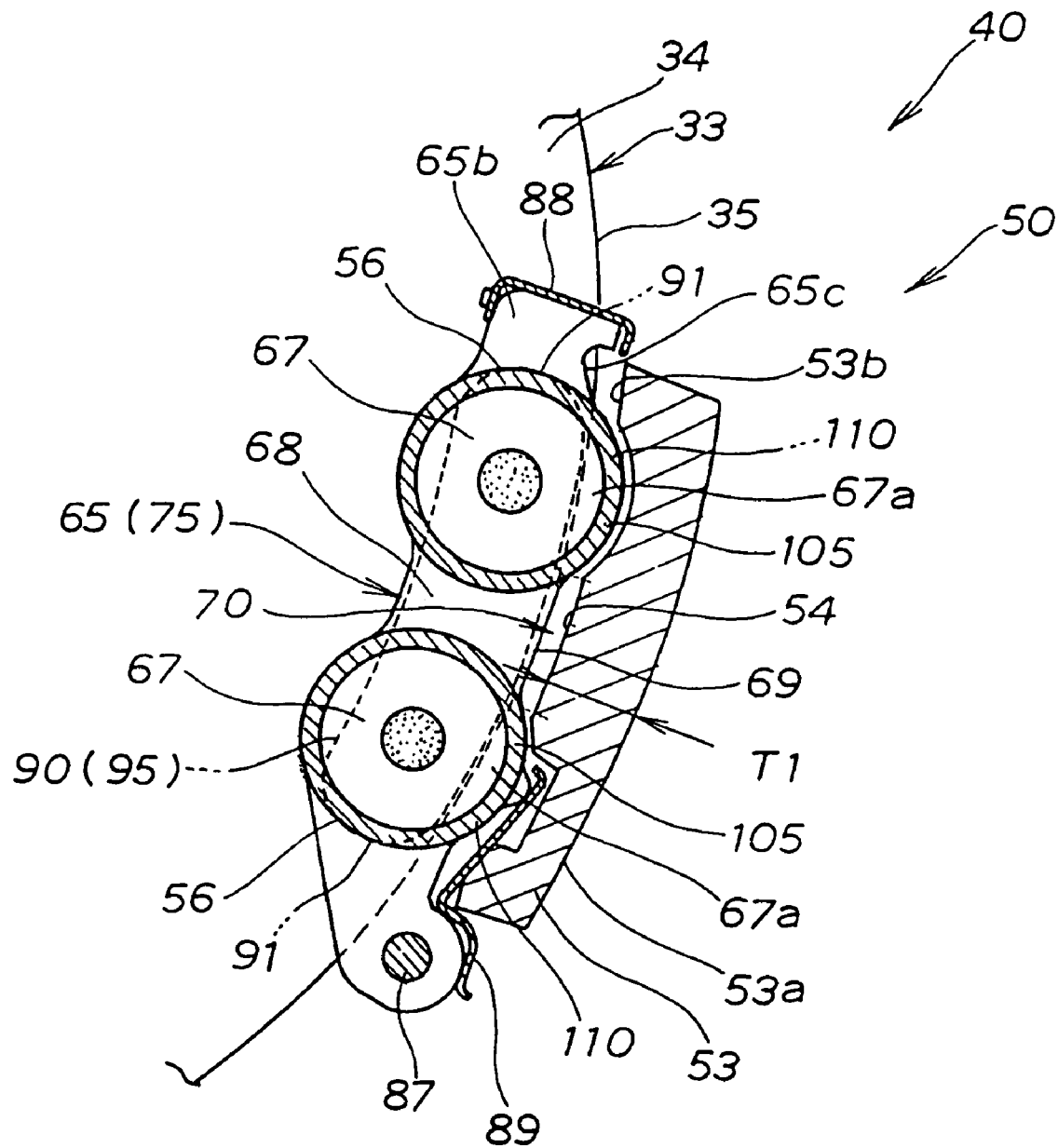
FIG. 6 is a cross sectional drawing along line 6-6 in FIG. 4.

FIG. 6 is a cross section along line 6-6 in FIG. 4. Parts of the outer back plate 65, piston correspondence parts (parts) 67, 67, corresponding to the pistons 56, 56 are formed in an arc shape following the outer profile of the pistons 56, 56, and another part 68 beside these (that is, parts connecting the piston correspondence sections 67, 67) is formed following the outer edge 35 of the brake disc 33.

In this way, the outer peripheries of the piston correspondence parts 67, 67 are brought into contact with the entire surface of the annular pressing surfaces 110, 110 (refer to FIG. 4 also) of the pistons 56, 56, and in this way openings 111, 111 (only one is shown in FIG. 4) of the pistons 56, 56 are blocked by the piston correspondence parts 67, 67.

As a result, it is possible to prevent dust etc. from infiltrating into the openings 111, 111 of the pistons 56, 56.

Also, by forming the piston correspondence parts 67, 67 in an arc shape following the outer profile of the pistons 56, 56, the part 67a is made to project from the outer edge 35 of the brake disc 33 to the outer side. On the other hand, the other part 68 is formed following the outer edge 35 of the brake disc 33.

Accordingly, the other part 68 is indented with respect to the parts 67a, 67a of the piston correspondence parts 67, 67, namely to the axle 31 (refer to FIG. 2) side, and the outer edge 69 of the other part 68 is pressed in by the parts 67a, 67a of the piston correspondence parts 67, 67.

The inner back plate 75 has the same shape as the outer back plate 65, and so the same structural elements have the same reference numerals and detailed description is omitted.

In this way, by forming the bridge section 53 following the outer back plate 65 and the inner back plate 75 part of the bridge section 53 facing the outer edges 69, 69 of the outer back plate 65 and the inner back plate 75, namely part 54 of the bridge section, can be made to project further inwards than the parts 105, 105 of the pistons 56, 56.

In addition, an indent section 65c indented to the inner side of the outer edge 35 of the brake disc 33 is provided on the tip section 65b of the outer back plate 65. This means that similarly to the part 54 of the bridge section, the part 53b within the bridge section 53 corresponding to the indent section 65c can be made to project further inwards than the parts 105, 105 of the pistons 56, 56.

By causing the part 54 of the bridge section to project further inwards than the parts 105, 105 of the pistons 56, 56, and causing that part 53b within the bridge section 53 corresponding to the indent section 65c to project further inwards than the parts 105, 105 of the pistons 56, 56, it is possible to keep the thickness T1 (refer to FIG. 4) of the bridge section 53 large without causing the outer surface 53a of the bridge section 53 to project outwards.

In this way, it is possible to maintain rigidity of the caliper body 50 without making the outer profile of the caliper body 50 large.

Also, when the outer periphery 34 of the brake disc 33 is gripped by the outer pad 90 and the inner pad 95, comparatively large stress is generated in the vicinity of the pistons 56, 56.

Therefore, the pistons 56, 56 are aligned at specified intervals along the outer peripheral direction of the brake disc 33 and the part 54 of the bridge section 53 is made to project into the gap 70 between the pistons 56, 56.

In this way, it is possible to efficiently increase the rigidity of the pistons 56, 56 with the part 54 of the bridge section 53.

In addition, using the interval of the gap 70 between the pistons 56, 56 it is possible to cause the part 54 of the bridge section 53 to project, and since the part 54 of the bridge section 53 is made to project there is no need to ensure a new space.

In this way it is possible to increase the rigidity of the caliper body 50 without making the outer profile of the caliper body 50 large.

Figure 7:
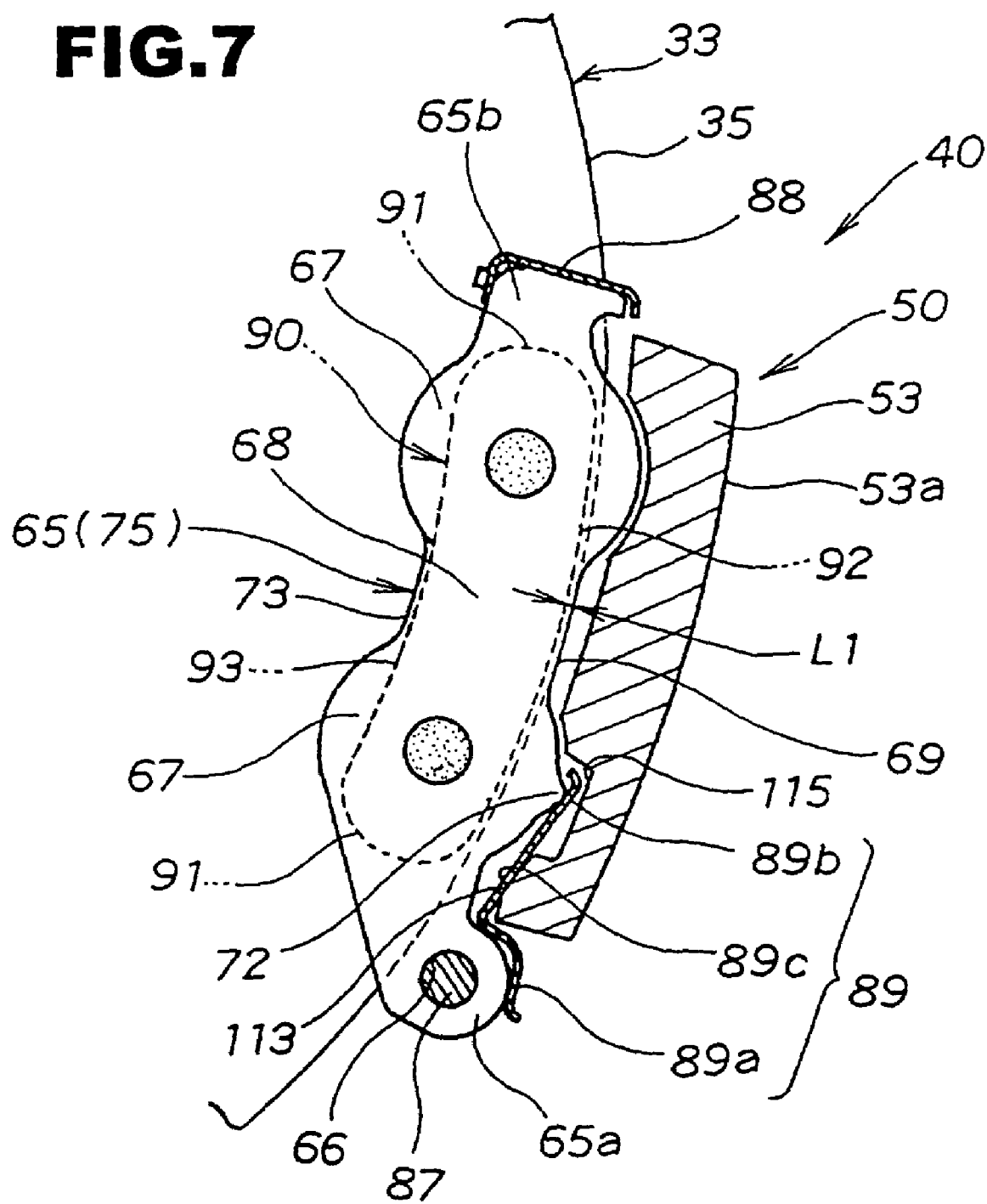
FIG. 7 is a cross sectional drawing along line 7-7 in FIG. 4.

FIG. 7 is a cross section along line 7-7 in FIG. 4.

The outer back plate 65 has piston correspondence parts 67, 67 corresponding to the pistons 56, 56 (refer to FIG. 6) formed in an arc shape following the pistons 56, 56, a projection 72 formed on a base end 65a side piston correspondence part 67, and an outer edge 69 of another part 68 formed following the outer edge 35 of the brake disc 33.

The inner back plate 75 has the same shape etc., and detailed description is omitted.

The back plate pin 87 is fitted into the slide hole 66 formed in the base end 65a of the outer back plate 65, and the tip section 65b of the outer back plate 65 is supported by the retainer 88. Similarly, the back plate pin 87 is fitted into the slide hole 66 formed in the base end 65a of the inner back plate 75 (refer to FIG. 3) and the tip section 65b of the inner back plate 75 (refer to FIG. 3) is supported by the retainer 88.

In this way, it is possible to support the outer back plate 65 and the inner back plate 75 in such a way that they can slide in a direction orthogonal to the brake disc 33.

Also, a curved base end 89a of the back plate spring 89 is brought into contact with the base end 65a of the outer back plate 65 and the tip 89b of the back plate spring 89 is brought into contact with the projection 72. Similarly, a curved base end 89a of the back plate spring 89 is brought into contact with the base end 65a of the inner back plate 75 (refer to FIG. 3) and the tip 89b of the back plate spring 89 is brought into contact with the projection 72 (not shown).

Accordingly, the projection 72 of the outer back plate 65 and the projection 72 of the inner back plate 75 are pressed by the tip 89b of the back plate spring 89, to prevent rattling of the outer back plate 65 and the inner back plate 75.

A storage indent 115 for storing the back plate spring 89 is formed in the bridge section 53 of the caliper body 50.

The outer pad 90 is provided at the brake disc 33 side of the outer back plate 65. This outer pad 90 is arranged a distance L1 inwards from the outer edge 35 of the brake disc 33, and is formed in a curved shape along the outer edge 35.

In this way, the outer pad 90 is arranged so that it is not forced out further than the outer edge 35 of the brake disc 33.

This outer pad 90 is formed in an arc shape with both ends 91, 91 matching the outer periphery of the pistons 56, 56 (refer to FIG. 6), the outward peripheral edge 92 is arranged a distance L1 inward from the outer edge 69 of the outer back plate 65, and the inner peripheral edge 93 is arranged a distance L1 outward from the inner edge 73 of the outer back plate 65.

Therefore, the outer pad 90 is arranged so that it is not forced outwards from the outer back plate 65, and it is possible to efficiently convey pressing force of the pistons 56, 56 (refer to FIG. 6) to the outer pad 90 through the outer back plate 65.

The inner pad 95 is the same shape etc. as the outer pad 90, and detailed description is omitted.

Figure 8:
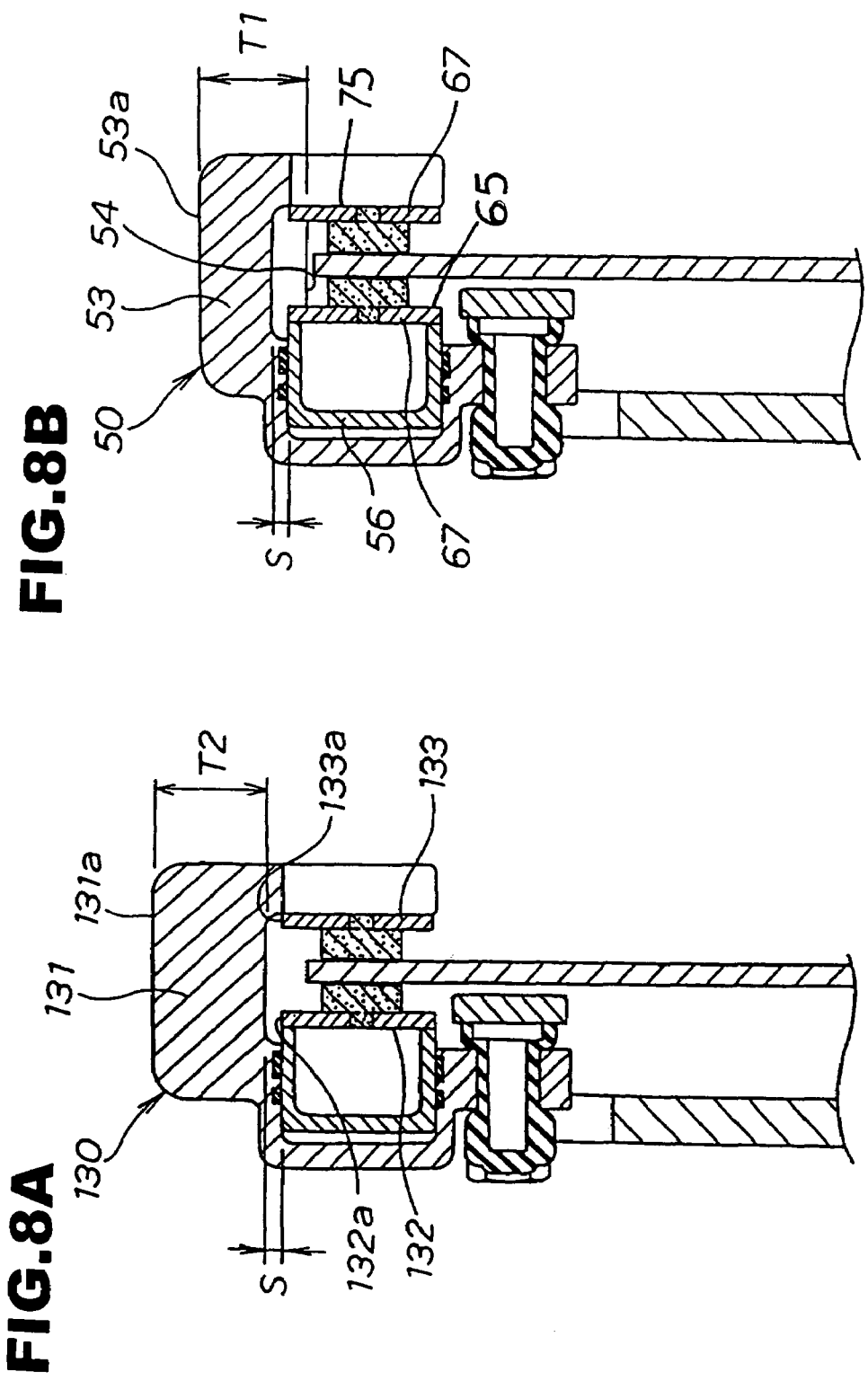
FIG. 8(a) is a drawing for describing a motorcycle disk brake unit of related art relative to the characteristics of the motorcycle disk brake unit (first embodiment) of the present invention as shown in FIG. 8(b).

FIG. 8(a) and FIG. 8(b) are drawings for describing characteristics of the motorcycle disc brake unit (first embodiment) of the present invention, with FIG. 8(a) showing a related art type as a comparative example, and FIG. 8(b) showing the embodiment.

In FIG. 8(a), a distance S between the outer edges 132a and 133a and the bridge section 131 must be maintained in order to prevent interference between the bridge section 131 of the caliper body 130 and the outer edges 132a and 133a of the outer back plate 132 and inner back plate 133.

For this reason, in order to maintain rigidity of the bridge section 131, it is necessary to cause the outer surface 131a of the bridge section 131 to project outwards, and to maintain the thickness T2 of the bridge section 131, and this prevents miniaturization of the caliper body 130.

In FIG. 8(b), with reference also to FIG. 6, within the outer back plate 65, piston correspondence parts (parts) 67, 67 corresponding to the pistons 56, 56 are formed in an arc shape following the pistons 56, 56.

The inner back plate 75 also has the same shape as the outer back plate 65.

In order to prevent interference between the piston correspondence parts 67, 67 of the outer back plate 65 and the piston correspondence parts 67, 67 of the inner back plate 75, and the bridge section 53 of the caliper body 50, it is necessary to maintain the distance S between the piston correspondence parts 67, 67 of the outer back plate 65 and the piston correspondence parts 67, 67 of the inner back plate 75, and the bridge section 53.

On the other hand, as shown in FIG. 6, within the outer back plate 65, the other part 68 is formed following the outer edge 35 of the brake disc 33. In this way, the outer edge 69 of the other part 68 is indented by the parts 67a, 67a of the piston correspondence parts 67, 67.

It is therefore possible to cause the part 54 of the bridge section to project further inwards than the pistons 56, 56.

Accordingly, it is possible to keep the thickness T1 (refer to FIG. 4 and FIG. 6) of the bridge section 53 large without causing the outer surface 53a of the bridge section 53 to project outwards. This means that it is possible to ensure rigidity of the caliper body 50 without making the outer profile of the caliper body 50 large.

A second embodiment will now be described.

Figure 9:
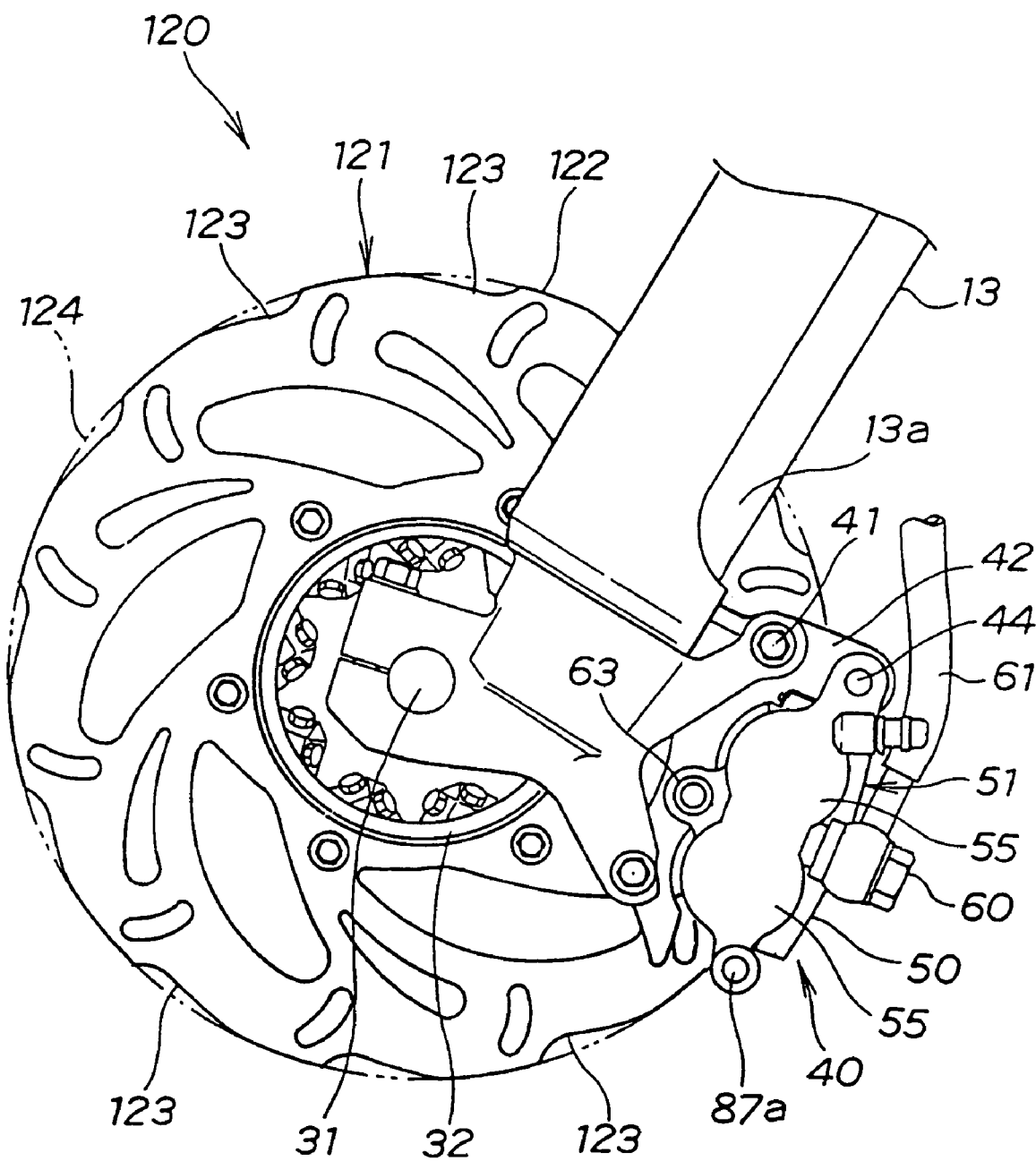
FIG. 9 is a cross sectional drawing showing a motorcycle disk brake unit (second embodiment) of the present invention.
Figure 10:
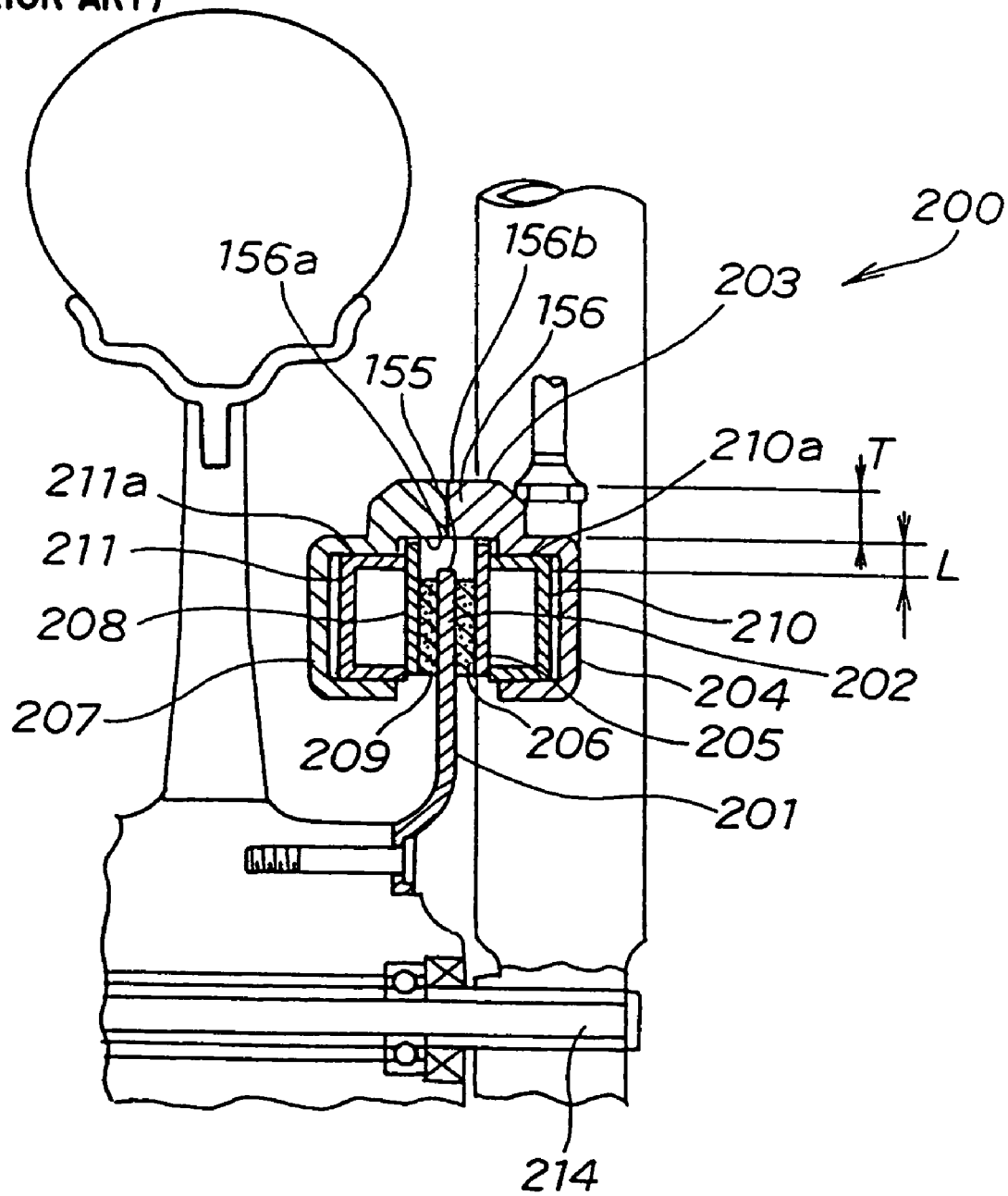
FIG. 10 is a cross sectional drawing showing a motorcycle disk brake unit of the related art.

FIG. 9 is a side view showing a motorcycle disk brake unit (second embodiment) of the present invention.

The motorcycle disk brake unit 120 of the second embodiment is provided with a brake disk 121 instead of the brake disc 33 of the motorcycle disk brake unit 30, and the remaining structure is the same as the first embodiment.

The brake disk 121 has indentations 123 . . . formed at specified intervals on the outer edge 122. By forming the indentations 123 . . . in the outer edge 122 it is possible to reduce the weight of the brake disk 121, and it is also possible to improve the design characteristics.

In the case of adopting this brake disk 121, a circumscribed circle (shown by a dotted line) 124 contacting the apex 122a of the outer periphery 122 is equivalent to the outer edge 35 (refer to FIG. 2) of the brake disc 33 constituting the first embodiment. Therefore, similarly to the motorcycle disk brake unit 30 of the first embodiment, having the caliper body 50, outer back plate 65, inner back plate 75, outer pad 90 and inner pad 95 (refer to FIG. 3) etc. arranged with the outer edge 35 of the brake disc 33 as a datum, in the motorcycle disk brake unit 120 of the second embodiment the caliper body 50, outer back plate 65, inner back plate 75, outer pad 90 and inner pad 95 etc. are arranged with the circumscribed circle 124 of the brake disk 121 as a datum.

With the previously described embodiments, description was given of a floating type disk brake unit where the pistons 56 are only provided at the outer section 51 of the caliper body 50, and both sides of a brake disk 33, 121 are gripped by pads 90, 95 by causing the caliper body 50 to slide, but this is not limiting and it is also possible to apply, for example, to a disk brake unit provided with pistons in both an outer part and an inner part of a caliper body.

Also, with the previously described embodiments, description was given of an example with the motorcycle disk brake unit 30, 120 provided on a front wheel 14 side, but the disk brake unit can also be applied to the rear wheel 19 side. Also, with the previously described embodiments, description was given of examples where two pistons 56 were provided in the outer section 51 of the caliper body 50, but the number of pistons 56 can be arbitrarily selected.

The present invention achieves the following effects.

Claim 1 moves the center of a piston from the axle to be offset at an outer side of the brake disc, by causing part of the piston to project outwards from an outer edge of the brake disk.

In this way, it is possible to increase brake force by separating the center of the piston from the axle. This means that it is possible to reduce the size of the piston while maintaining brake force.

Further, by causing part of the bridge section to project further inward than the cylinder, it is possible to keep the thickness of the bridge section large without causing the outer surface of bridge section to project outwards.

Accordingly, it is possible to maintain rigidity of the caliper without making the external profile of the caliper body large. In this way, increase in size of the caliper body is prevented and by reducing the size of the piston it is possible to reduce the size of the brake unit.

Claim 2 can achieve the same effects as claim 1.

In addition, sections corresponding to the piston are formed in the outer back plate and inner back plate, following the piston.

In this way, the back plates come into contact with the entire pressing surface of the piston, the piston openings are blocked, and it is possible to prevent the infiltration of dust etc. into the piston opening.

The bridge section projects between a plurality of pistons. In this way, it is possible to efficiently increase the rigidity of the vicinity of the pistons with the bridge section.

In addition, by utilizing a space between the plurality of pistons it becomes possible to cause part of the bridge section to project, and since part of the bridge section is caused to project there is no need to ensure a new space.

In this way, it is possible to increase rigidity of the caliper body without making the shape of the caliper body large.

The invention claimed is:

1. A disk brake unit for a motorcycle, having at least one piston built into a caliper body having a substantially U-shaped cross section with an outer section and an inner section connected by a bridge section, an outer pad attached to the outer section via an outer back plate, an inner pad attached to the inner section via an inner back plate, and an outer periphery of a brake disk inserted between the outer pad and the inner pad wherein on actuation of said piston, said outer pad and inner pad press said brake disk, wherein part of the piston projects beyond an outer peripheral edge of the brake disk to an outer side, the outer pad and the inner pad do not project out further than the outer peripheral edge of the brake disk, with the inner back plate and the outer back plate, that part corresponding to the piston is formed to have a portion which follows an outer peripheral edge of the piston, while the remaining part is formed to have a portion which follows the peripheral edge of the brake disk, and part of the bridge section projects further inwards than the outer peripheral edge of the piston by forming the bridge section to have a portion which follows the respective back plates.

2. The disk brake unit for a motorcycle according to claim 1, wherein there are a plurality of pistons, the plurality of pistons being lined up along the outer peripheral edge of the brake disk at specified intervals, with part of the bridge section being caused to project between these pistons.

* * * * *